United States Patent [19]

Nagashima et al.

[11] Patent Number: 5,400,392
[45] Date of Patent: Mar. 21, 1995

[54] LOCATION REGISTRATION SYSTEM ENABLING A RADIO TELEPHONE SET TO AUTOMATICALLY START LOCATION REGISTRATION AFTER TRAVEL FOR USE IN A MOBILE RADIO TELEPHONE NETWORK

[75] Inventors: Noriaki Nagashima; Kohji Momma, both of Tokyo, Japan

[73] Assignees: NEC Corporation; Nippon Telegraph and Telephone Corporation, both of Tokyo, Japan

[21] Appl. No.: 668,611

[22] Filed: Mar. 13, 1991

[30] Foreign Application Priority Data

Mar. 14, 1990 [JP] Japan ................ 2-65391

[51] Int. Cl.$^6$ .............. H04M 11/00; H04B 1/38; H04B 1/40
[52] U.S. Cl. ....................... 379/60; 455/73; 455/75
[58] Field of Search ............... 379/56, 58, 59, 60, 379/88; 455/73, 75, 76, 260, 343

[56] References Cited

U.S. PATENT DOCUMENTS 4,812,893  3/1989  Champion, III et al. ........... 379/88

FOREIGN PATENT DOCUMENTS 1245639 10/1986 Japan .
0026942  2/1987 Japan ........................ 455/73
2-050532  2/1990 Japan .
0060534  3/1991 Japan ........................ 455/75

OTHER PUBLICATIONS

*Patent Abstracts of Japan*, vol. 11, No. 95 (E-492), Mar. 25, 1987; and JP-A-61 245 639 (NEC Corporation), Oct. 31, 1986.
*Patent Abstracts of Japan*, vol. 14, No. 213 (E-923), May 7, 1990; and JP-A-2 050 532 (Iwatsu Electric Co., Ltd.), Feb. 20, 1990.

*Primary Examiner*—Curtis Kuntz
*Assistant Examiner*—W. Cumming
*Attorney, Agent, or Firm*—Ostrolenk, Faber, Gerb & Soffen

[57] ABSTRACT

For starting a registration operation of location information of movable radio telephone sets into a subscriber's file in a line connection unit connected to radio connection devices in a mobile telephone network system after travel of each of the radio telephone sets, each radio telephone set is provided with a unit for measuring a travel amount. The radio telephone set produces a request signal for the location information registration when the travel amount measured exceeds a first threshold value. Alternatively, the radio telephone set reset the measuring unit when the travel amount measured exceeds a first threshold value and thereafter produces a request signal for the location information registration when the travel amount measured does not exceed a second threshold value smaller that the first threshold value. Radio connection devices announce location information signals and each radio telephone set holds, as a held location information, the location information registered in the subscriber's file. When the telephone set receives one of the location information signals which has location information different from the held location information, the radio telephone set produces another request for registration of the different location information.

4 Claims, 15 Drawing Sheets

SUBSCRIVER'S FILE
| REGISTRATION AREA | | CANDIDATE AREA | |
|---|---|---|---|
| TELEPHONE NUMBER | LOCATION NUMBER | ZONE NUMBER | LEVEL DATA |
|  |  |  |  |
|  |  |  |  |
|  |  |  |  |
52 — 53 — 54 — 55
50 — 51
46
FIG. 3
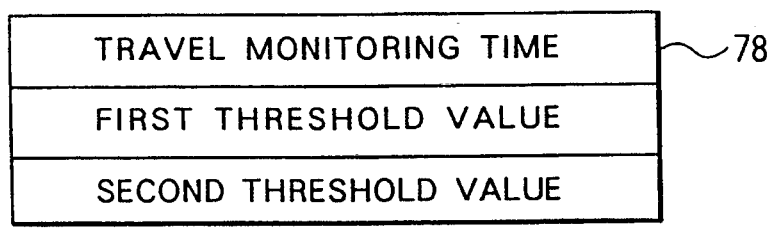
FIG. 4
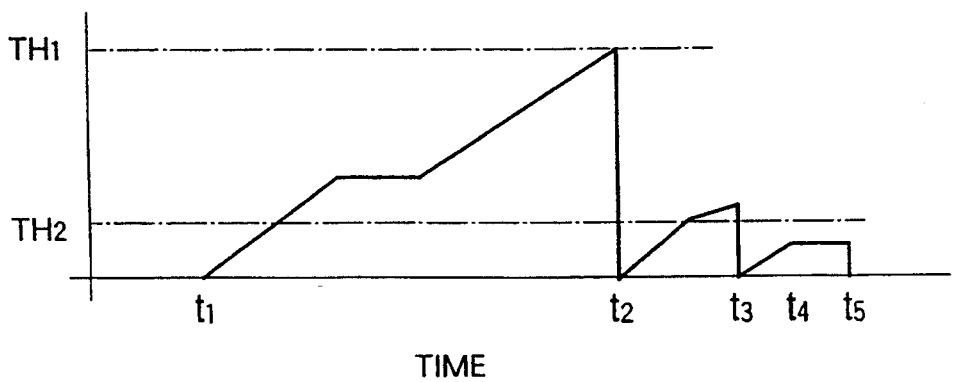
FIG. 5

|     |              |                              |
|-----|--------------|------------------------------|
| 130 | REGISTRATION FILE | ZONE NUMBER |
|     |              | FILED LEVEL                  |
|     |              | RECEPTION STATUS (PRESENT/WAIT) |
| 131 | CANDIDATE FILE | CANDIDATE ZONE NUMBER |
|     |              | CANDIDATE FIELD LEVEL        |
|     |              | RECEPTION STATUS (PRESENT/WAIT) |

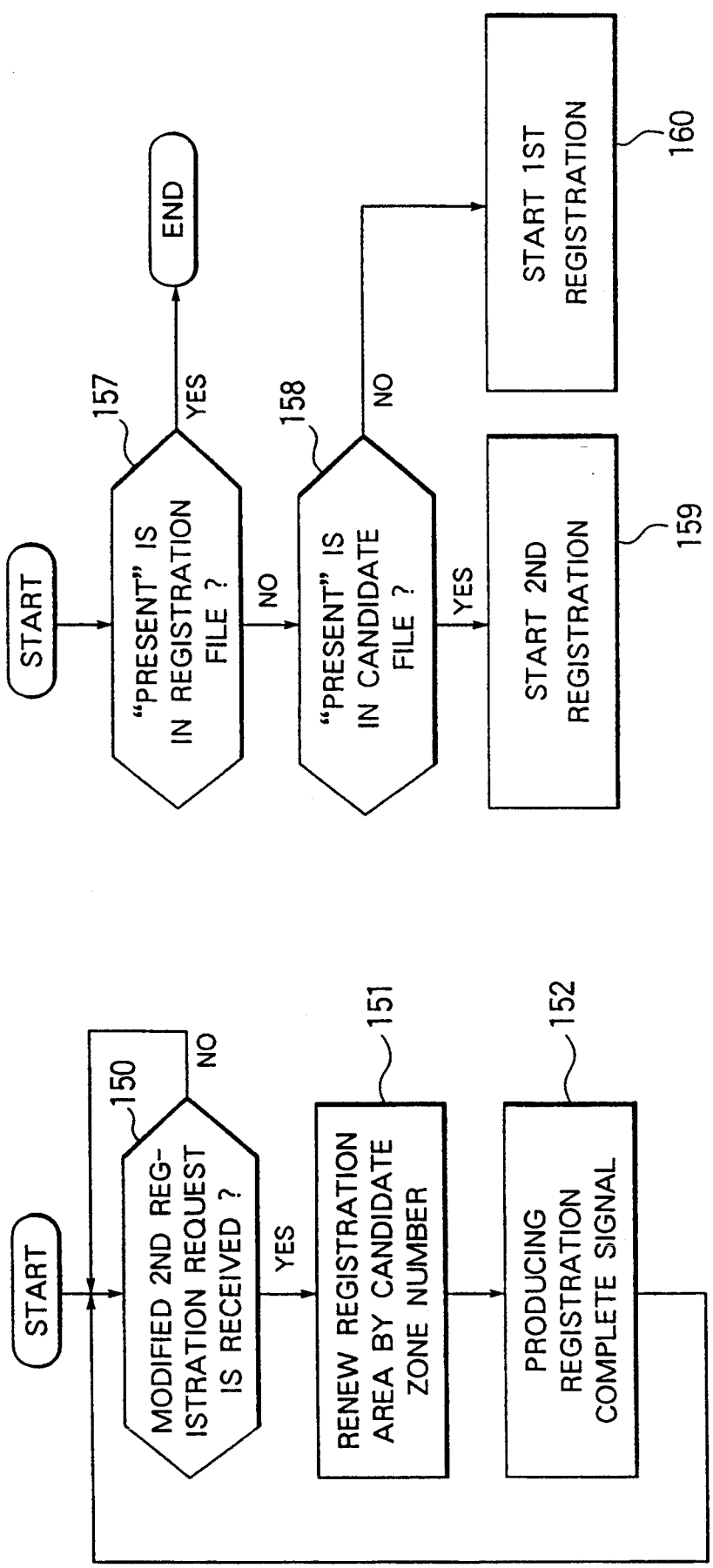

LOCATION REGISTRATION SYSTEM ENABLING A RADIO TELEPHONE SET TO AUTOMATICALLY START LOCATION REGISTRATION AFTER TRAVEL FOR USE IN A MOBILE RADIO TELEPHONE NETWORK

BACKGROUND OF THE INVENTION

The present invention relates to a mobile radio telephone network system and, in particular, to a location registration system for registering a location of a radio telephone set in the mobile telephone network system.

A mobile telephone network system of the type described generally comprises a telephone line and a plurality of radio telephone sets. The radio telephone sets are movable or travel in an area which is divided into a predetermined number of zones.

A plurality of radio connection devices or radio communication devices are assigned to the respective zones. Now, providing that all radio telephone sets are alive, that is, capable of always carrying out communication, and are moving among the zones, some of the radio telephone sets can use the radio connection device assigned to the zone in which the radio telephone sets in question are present at a time.

Between the telephone line and the radio connection devices, a line connection unit or a line control unit is connected for controlling communication between the telephone line and the radio connection devices. In detail, the line connection unit connects the telephone line with a particular one of the radio connection devices assigned to a particular one of the zones in which a particular one of the radio telephone sets is present at a time, in order to enable the particular radio telephone set to carry out communication with the telephone line through the particular radio connection device and the line connection unit.

In order to enable the line connection unit to select the particular one among the radio connection devices, the line connection unit must hold location information therein which is indicative of a particular zone number of the particular radio connection device in which the particular radio telephone set is present.

To this end, the mobile telephone network system has a location registration system.

In a conventional location registration system, the line connection unit has a subscriber's file for memorizing a list of the telephone numbers or identification (ID) numbers of the radio telephone sets and numbers of zones in which those radio telephone sets are present. Each of the radio telephone sets has a key which is operated by a user of the radio telephone set. When the user operates the key of the particular radio telephone set, the particular radio telephone set transmits a location registration request signal. One or more of the radio connection devices receive the location registration request signal as received request signals, respectively, and detect electric field strength or level of the received request signals. That is, those one or more radio connection devices serves as receiving devices. The receiving devices form modified request signals by adding the electric field strength signal and the zone numbers assinged to those receiving devices to the received request signal, and transmit the modified request signals to the line connection unit. The line connection unit receives those modified request signals and compares the electric field stregths in the modified request signals with one another. Then, the line connection unit decides a particular one of the modified request signals which has the highest one of the electric field strengths and registers the zone number in the particular modified request signal together with the telephone number of the particular radio telephone set into the subscriber's file. Thus, it is possible to renew the location information of the radio telephone sets registered in the subscriber's file in the line connection unit.

However, it is impossible to renew the location information of the radio telephone sets in the subscriber's file, if the user does not operate the key in his radio telephone set when his telephone set travels.

SUMMARY OF THE INVENTION

Accordingly, it is an object of the invention to provide a location registration system for use in the mobile telephone network system which enables any one of the radio telephone sets to automatically start the location registration after completion of its travel.

The present invention is applicable to a location registration system for carrying out a registration of location information of movable radio telephone sets into a subscriber's file of a line connection unit through radio connection device connected to the line connection unit in a mobile telephone network system. According to the present invention, the system comprises means associated with each of the radio telephone sets for measuring a travel amount of each radio telephone set. Each of the radio telephone sets comprises: means coupled with the travel amount measuring means for monitoring the travel amount in the travel amount measuring means as a monitored travel amount; means coupled with the monitoring means for deciding completion of the travel of each radio telephone set; and means coupled with the travel completion deciding means for starting the registration of location information.

In another location registration system according to the present invention, each of the radio connection devices comprises means for transmitting an individual location announcement signal having an individual zone number, and each of the radio telephone sets comprises: a first memory file for memorizing a first status signal and first location information having a first zone number; a second memory file for memorizing a second status signal and second location information having a second zone number; means for receiving the individual location announcement signals as a particular location announcement signal having the individual zone number as a particular zone number; means coupled with the first memory file and the receiving means for comparing the first zone number with the particular zone number, the comparing means producing a coincident signal when the first zone number is coincident with the particular zone number, the comparing means producing an error signal when the first zone number is different from the particular zone number; first writing means coupled with the comparing means and the first memory file responsive to the coincident signal for writing particular status information in the first memory file as the first status signal; second writing means coupled with the comparing means and the second memory file responsive to the error signal for writing the particular zone number and the particular status information in the second memory file as the second zone number and the second status information, respectively; first reading means coupled with the first memory file for reading the first status signal to produce an access signal when the first status signal is not indicative of the particular status information; second reading means coupled with the first reading means and the second memory file responsive to the access signal for reading the second status signal to produce a first start signal when the second status signal is indicative of the particular status information; and means coupled with the second reading means responsive to the first start signal for starting a first operation for the registration of location information.

BRIEF DESCRIPTION OF THE DRAWINGS:

FIG. 3 is a diagram illustrating contents of an RAM in a line connection unit in FIG. 2;

FIG. 4 is a diagram illustrating contents of an RAM in a radio telephone set in FIG. 2;

FIG. 5 is a view illustrating control operation of a travel measuring unit by a set controller in FIG. 2;

FIG. 19 is a flow chart illustrating operation of the unit controller for the second location registration; and FIG. 20 is a flow chart illustrating registration deciding operation of the set controller in the second embodiment.

DESCRIPTION OF PREFERRED EMBODIMENTS

Generally speaking, a mobile telephone network system comprises a telephone network 30, a plurality of telephone lines 31 connected to the telephone network 30 and a plurality of radio telephone sets (RTS) 32 which can travel or are movable in an area which is divided into a plurality of zones Z1 to Zn. Different telephone numbers are assigned to the radio telephone sets 32 and different zone numbers are also assigned to the zones Z1 to Zn.

One or more radio connection or communication devices (RCD) 33 are assigned in each zone Z1 to Zn and carry out communication with radio telephone set or sets 32 which are present in the zone at a time. The radio connection devices in one zone have the zone number and different device numbers. One of the radio connection devices in one zone serves as a main control device. In the following description, each zone will be described to have a single radio connection device as the main control device for the simplification of the description.

A line connection or communication unit (LCU) 34 is connected between the telephone lines 31 and the radio connection devices 33 for carrying out communication therebetween. The line connection unit 34 is connected to the telephone lines 31 and to the radio connection devices 33 through a plurality of connection lines 35.

The line connection unit 34 is provided with a subscriber's file which has telephone numbers of the radio telephone sets 32 and zone numbers as registered zone numbers in which those radio telephone sets 32 are present at a time. When a particular one of radio telephone sets 32 is called by one of the telephone lines, the line connection unit 34 refers to the file and connects the particular radio telephone sets 32 through the corresponding one of radio connection devices.

However, the radio telephone sets are movable in the area. Therefore, it is necessary to renew the registered zone numbers of the radio telephone sets 32 in the file of the line connection device.

The present invention is directed to a location registration for registering the number of a zone in which each radio telephone set is present after travel.

Figure 1:
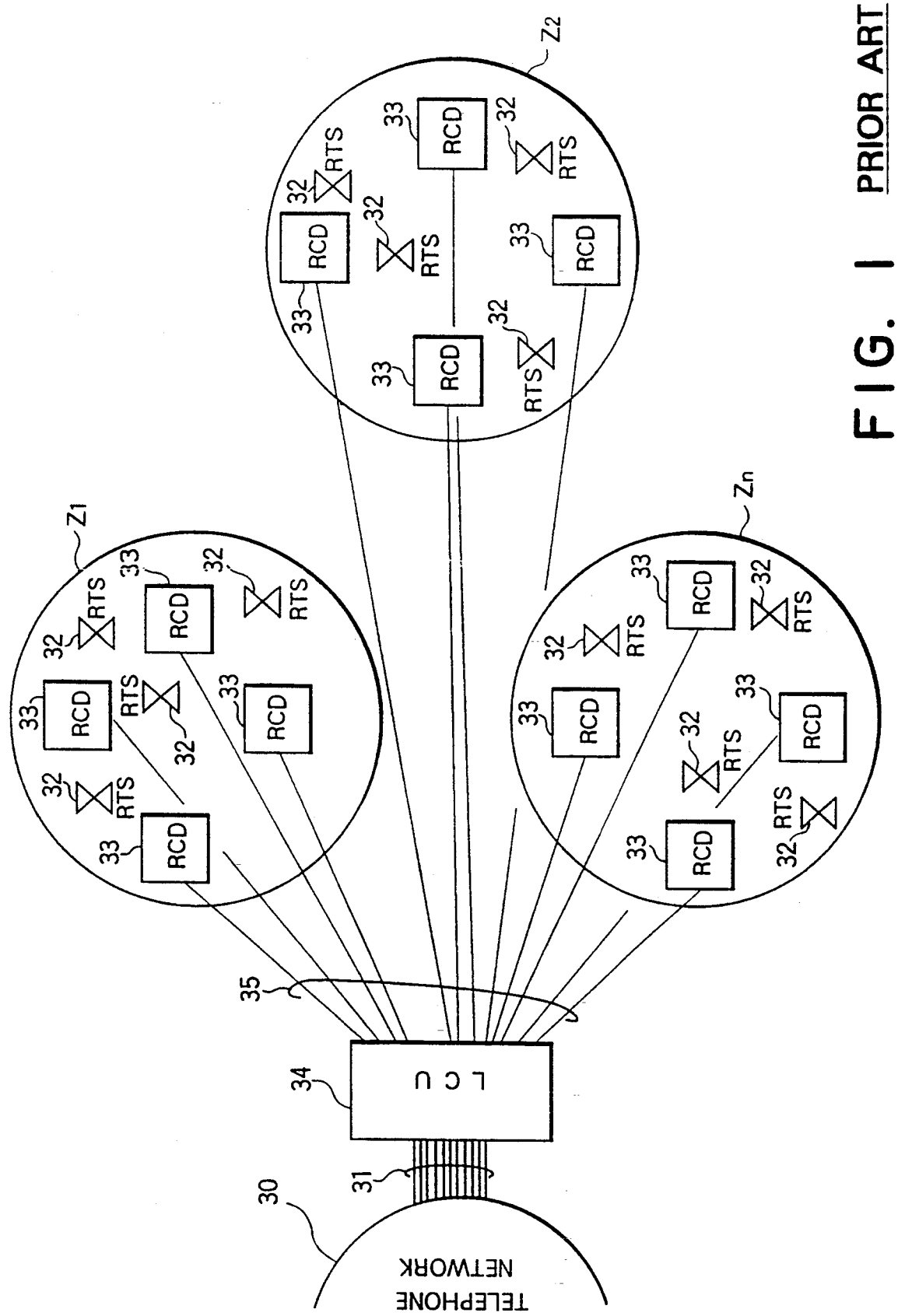
FIG. 1 is a schematic diagram view of a mobile communication system.
Figure 2:
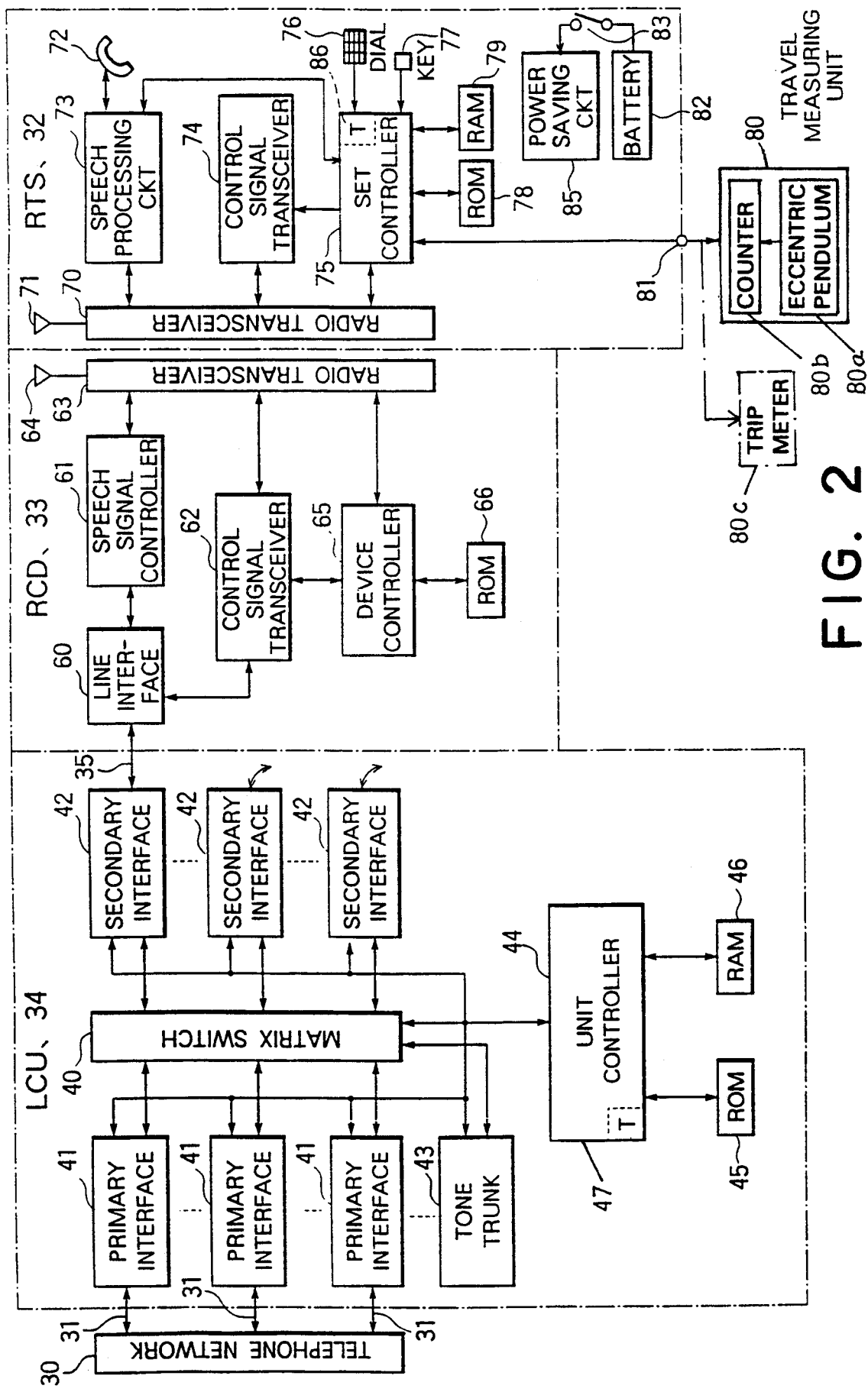
FIG. 2 is a block diagram view of a mobile communication system according to one embodiment of the present invention.

Referring to FIG. 2, the line connection unit 34 comprises a matrix switch 40, a plurality of primary interfaces 41 between respective telephone lines 31 and the matrix switch 40, and a plurality of secondary interfaces 42 between the matrix switch 40 and the respective connection lines 35. Each of the primary interfaces 41 is operable as an interface for use in connecting each of telephone lines 31 to the matrix switch 40. Each of the secondary interfaces 42 is operable as another interface for use in connecting each of the connection lines 35 and the matrix switch 40. Each of the connection lines is a two-wired transmission line. A tone trunk 43 is connected to the primary interfaces 41, to the secondary interfaces 42, and to the matrix switch 40 for generating various tone signals, such as a call tone signal and other tone signals.

A unit controller 44 is connected to the primary interfaces 41, the secondary interfaces 42, the matrix switch 40, and the tone trunk 43. The unit controller 44 is formed of a CPU and is associated with a read only memory (ROM) 45 and a random access memory (ROM) 46. The ROM 45 has various control programs such as a communication control program and a first location registration program, and control data. The RAM 46 has various data.

Referring to FIG. 3, the RAM 46 has a subscriber's file which comprises a registration area 50 and a candidate area 51. The registration area 50 comprises a telephone number column 52 and a location number column 53. In the telephone number column 52, telephone numbers assigned to the radio telephone sets 32 are memorized. In the location number column 53, numbers of zones in which the corresponding radio telephone sets are present at a time are written as registered location numbers. The candidate area comprises a zone number column 54 and a level data column 55. In the zone number column 54, a zone number is written which is in a modified first registration request signal during the first location registration operation. In the level data column 55, a reception field level is written which is in the modified first registration request signal during the first location registration operation.

Returning to FIG. 2, attention will be directed to one of the radio connection devices 33 that is illustrated at 33 in FIG. 2. The illustrated radio connection device 33 comprises a line interface 60 and a speech signal controller 61. The line interface 60 is connected to the connection line 35, a speech signal controller 61 and a control signal transceiver 62. The line interface 60 is operable as an interface for use in connecting the connection line 35 and the speech signal controller 61 for a speech signal. The line interface 60 is also operable as an interface for use in connecting the connection line 35 and the control signal transceiver 62 for a control signal.

A radio transceiver 63 is connected to the speech signal controller 61 and the control signal transceiver 62 and is of a multichannel access system for carrying out radio communication with one of the radio telephone sets 32 through a communication antenna 64.

The multichannel access system comprises a control channel and a prescribed number of speech or other communication channels. The control and the communication channels are of different radio frequencies and are shared by the radio connection devices 33 and the radio telephone sets 32.

The control channel is for use in transmitting a control signal between the radio connection device 33 and one of the radio telephone sets 32. The location registration which is directed by the present invention is carried out by use of the control channel. The radio connection device 33 further comprises a device controller 65 which is connected to the control signal transceiver 62 and the radio transceiver 63. The device controller 65 is of a CPU and is associated with a read only memory (ROM) 66. The ROM 66 memorizes various control programs such as the first location registration program and other programs and various control data including the zone number assigned to the own radio connection device 33.

It should be understood that each of other radio connection devices has a structure similar to the illustrated radio connection device 33.

One of the radio telephone sets 32 is shown in FIG. 2. The illustrated radio telephone set 32 comprises a radio transceiver 70 of the multichannel access system for carrying out radio communication with one of the radio connection devices 33 through a set antenna 71. The radio transceiver 70 is similar to the radio transceiver 63 of the radio connection device 33 and is operable in the similar manner. A handset 72 is connected to the radio transceiver 70 through a speech processing circuit 73. A control signal transceiver 74 and a set controller 75 are also connected to the radio transceiver 70. The control signal transceiver 74 is operable for use in connection between the radio transceiver 70 and the set controller 75 for the control signal. The set controller 75 is operable for use in control of the speech processing circuit 73, the control signal transceiver 74. A dialing key 76 is connected to the set controller 75. The dialing key 76 is for generating a dialing signal representative of either one of other radio telephone sets or one of subscriber telephone sets (not shown) connected to the telephone network 30 to supply the dialing signal to the set controller 75. A registration start key 77 is also connected to the set controller 75. The registration key 77 is for generating a start signal representative of start of the first location registration to the set controller 75.

The set controller 75 is also of a CPU and is associated with a read only memory (ROM) 78 and a random access memory (RAM) 79. The ROM 78 memorizes various control programs such as a travel deciding program, a first location registration program and other programs, and various control data including a telephone number of the own radio telephone set 32.

FIG. 4 illustrates a portion of the control data in the ROM 78. The shown control data comprise a travel monitoring time, a first threshold value, and a second threshold value smaller than the first threshold value which are used in execution of the travel deciding program.

The RAM 79 is for use in memorizing rewritable data including, as a registered zone number, a number of a zone in which the radio telephone set in question is present at a time.

A travel measuring unit 80 is connected to the set controller 75. The travel measuring controller 80 is operable for sensing movement of the own radio telephone set 32 to calculate a travel amount or distance. The calculated travel amount of the travel measuring unit 80 is periodically read out by the set controller 75 and is reset by the set controller 75. The travel measuring unit 80 is disposed separate from the telephone set 32 and is connected to the radio telephone set 32 through a connection terminal 81. It is needless to say that the travel measuring unit 80 may be mounted within the radio telephone set 32.

As the travel measuring unit 80, a conventional device is used which comprises an eccentric pendulum 80a and a counter 80b. The eccentric pendulum 80a vibrates in response to motion of the unit and number of vibration of the pendulum is counted by the counter 80b. Thus, a count number by the counter is representative of travel amount of the unit.

A conventional trip meter 80c may be also used as the travel measuring unit.

The radio telephone set 32 has a battery 82 as a power source therefor and a power switch 83 for switching on or off power supply to various portions within the radio telephone set 32. The radio telephone set 32 is also provided with a power saving circuit 85 for controlling the electric power level supplied.

Figure 6:
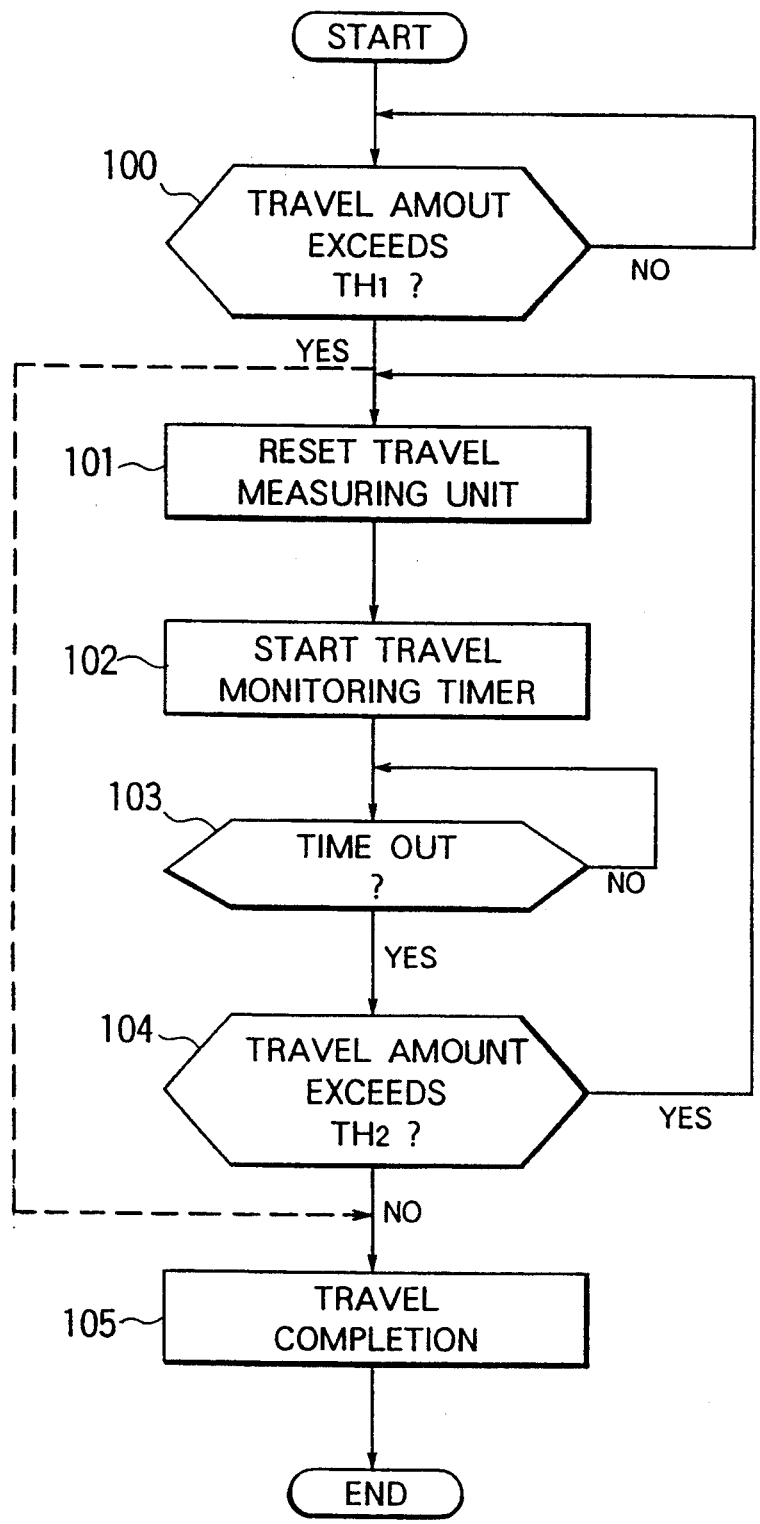
FIG. 6 is a flow chart illustrating a travel deciding operation of the set controller.

Referring to FIGS. 5 and 6, a travel decision by the set controller 75 will be described below.

The set controller 75 periodically monitors the travel measuring unit 80 according to the travel deciding program in the ROM 78. After the radio telephone set 32 starts at a time instant $t_1$ (FIG. 5) and continues to travel together with the travel measuring unit 80. The travel measuring unit 80 measures the travel amount. The travel amount is read out and compared with the first threshold value $TH_1$ (FIGS. 4 and 5) by the set controller 75, as shown at step 100 in FIG. 6.

When it is decided that the travel amount exceeds the first threshold value $TH_1$ as shown at $t_2$ in FIG. 5, the set controller 75 resets the travel measuring unit 80 at step 101 (FIG. 6) and starts a travel monitoring timer at step 102 (FIG. 6).

In detail, the set controller 75 has a timer 86 (FIG. 2). The travel monitoring time (78 in FIG. 4) is set to the timer 86. Alternatively, a time value of the travel monitoring time is written in a memory area in the RAM 79 (FIG. 2) and the time value is subtracted with time lapse.

The travel monitoring time value is determined small within a time range in which the travel measuring unit can measure travel of the radio telephone set. The travel monitoring time is, for example, 20 seconds.

When the travel monitoring time elapses at step 103 (FIG. 6), the set controller 75 again reads out the travel amount from the travel measuring unit 80 and compares the travel amount with the second threshold value $TH_2$ (FIGS. 4 and 5) at step 104 (FIG. 6). When the travel amount exceeds the second threshold value $TH_2$ as shown at $t_3$ in FIG. 5, the set controller 75 again resets the travel measuring unit 80. That is, the control step by the set controller 75 returns to step 101. Thus, a series of control steps 101-104 are repeated. When the travel amount is lower than the second threshold value $TH_2$, the set controller 75 decides travel completion of the radio telephone set 32, that is, stop of the travel of the radio telephone set 32.

When the set controller 75 decides the travel completion, it starts an operation for executing the first location registration operation of the system.

In the travel decision described above, steps 101-104 may be omitted. As a result, when it is decided that the travel amount exceeds the first threshold value TH1 at step 100, the step proceeds from 100 to 105 directly as shown by a dotted line in FIG. 6.

Now, the first location registration operation will be described referring to FIGS. 7-10, below.

Figure 7:
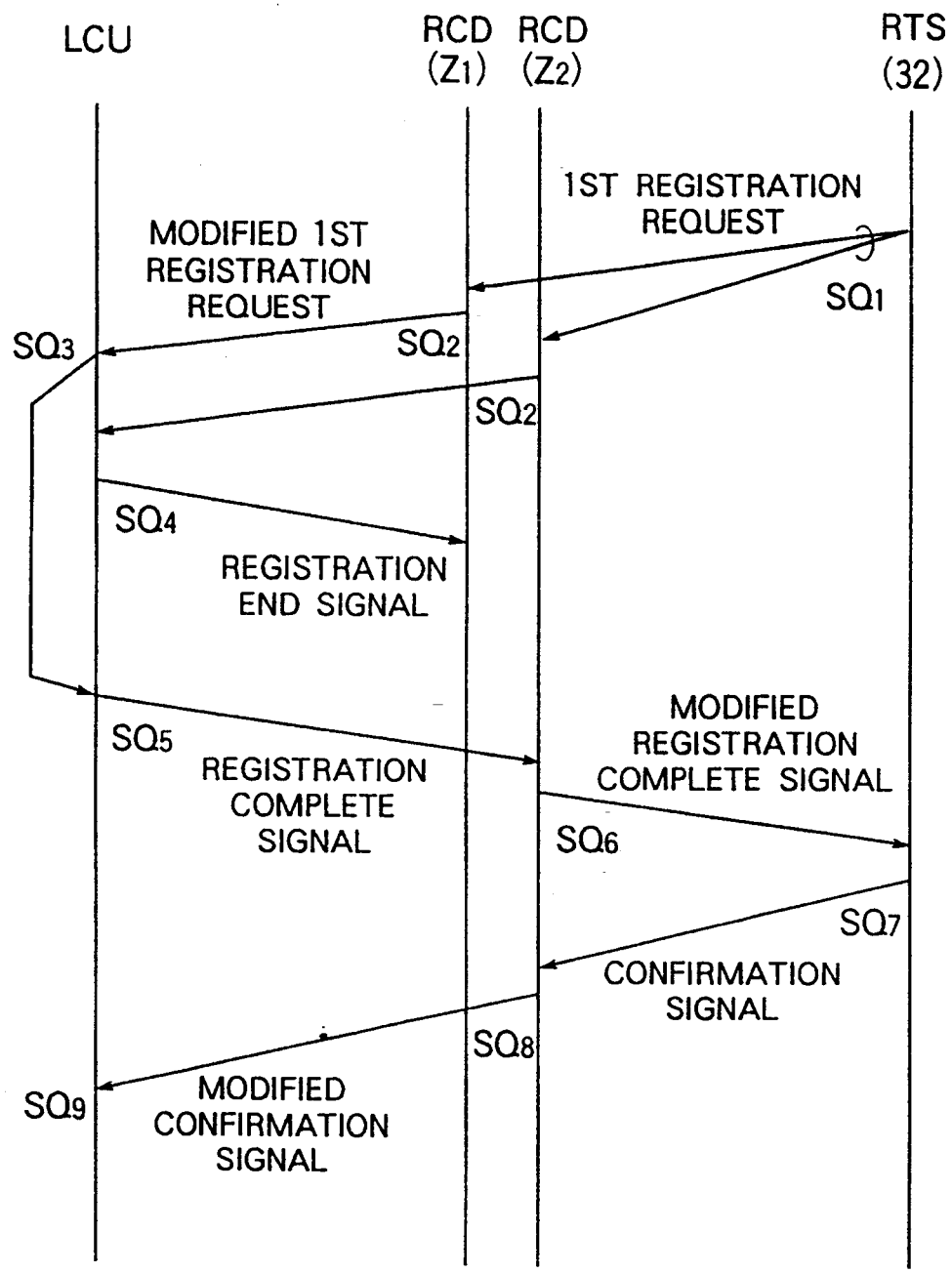
FIG. 7 is a diagram illustrating a first location registration operation according to a first embodiment.

The set controller 75 produces a first registration request signal (step 106 in FIG. 8) which is then transmitted through the control signal transceiver 74 and the radio transceiver 70 (FIG. 2) as shown at $SQ_1$ in FIG. 7. The first registration request signal comprises a preamble, a synchronizing signal and the own telephone number.

The first registration request signal is received at one or more radio connection devices 33 in one or more zones $Z_1$-$Z_n$. In FIG. 7, radio connection devices in two zones $Z_1$ and $Z_2$ are presumed to receive the first registration request signal.

Referring to FIG. 2, in each of the radio connection devices 33, the first registration request signal is received at the radio transceiver 63 through antenna 64 and is supplied to the device controller 65 through the control signal transceiver 62. The radio transceiver 63 detects an electric field strength of the first registration request signal as the reception field level signal. The reception field level signal is supplied to the device controller 65.

Figure 9:
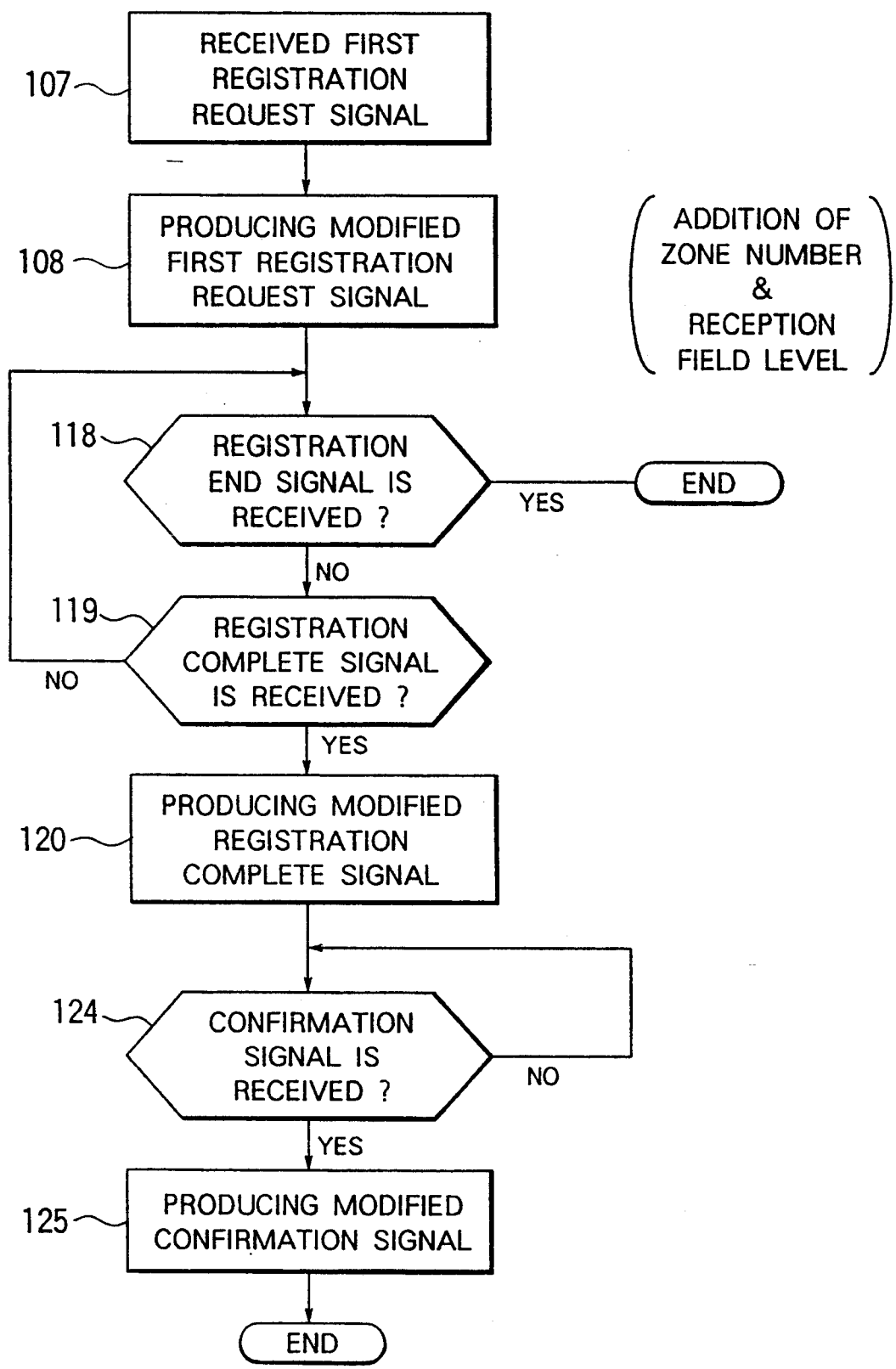
FIG. 9 is a flow chart illustrating operation of a device controller in FIG. 2 for the first location registration according to the first embodiment.

Referring to FIG. 9, the device controller 65 receives the first registration request signal at step 107 and then produces a modified first registration request signal by adding the reception field level signal and the own zone number to the first registration request signal at step 108. The modified first registration request signal is transmitted, as shown at $SQ_2$ in FIG. 7, to the line connection unit 34 through the control signal transceiver 62, the line interface and the connection line 35 (FIG. 2). In FIG. 7, the radio connection device 33 in zone $Z_1$ transmits the modified first registration request signal earlier than the radio connection device 33 in zone $Z_2$.

In the line connection unit 34, the modified first registration request signal is supplied to the unit controller 44 through the secondary interface 42.

Figure 10:
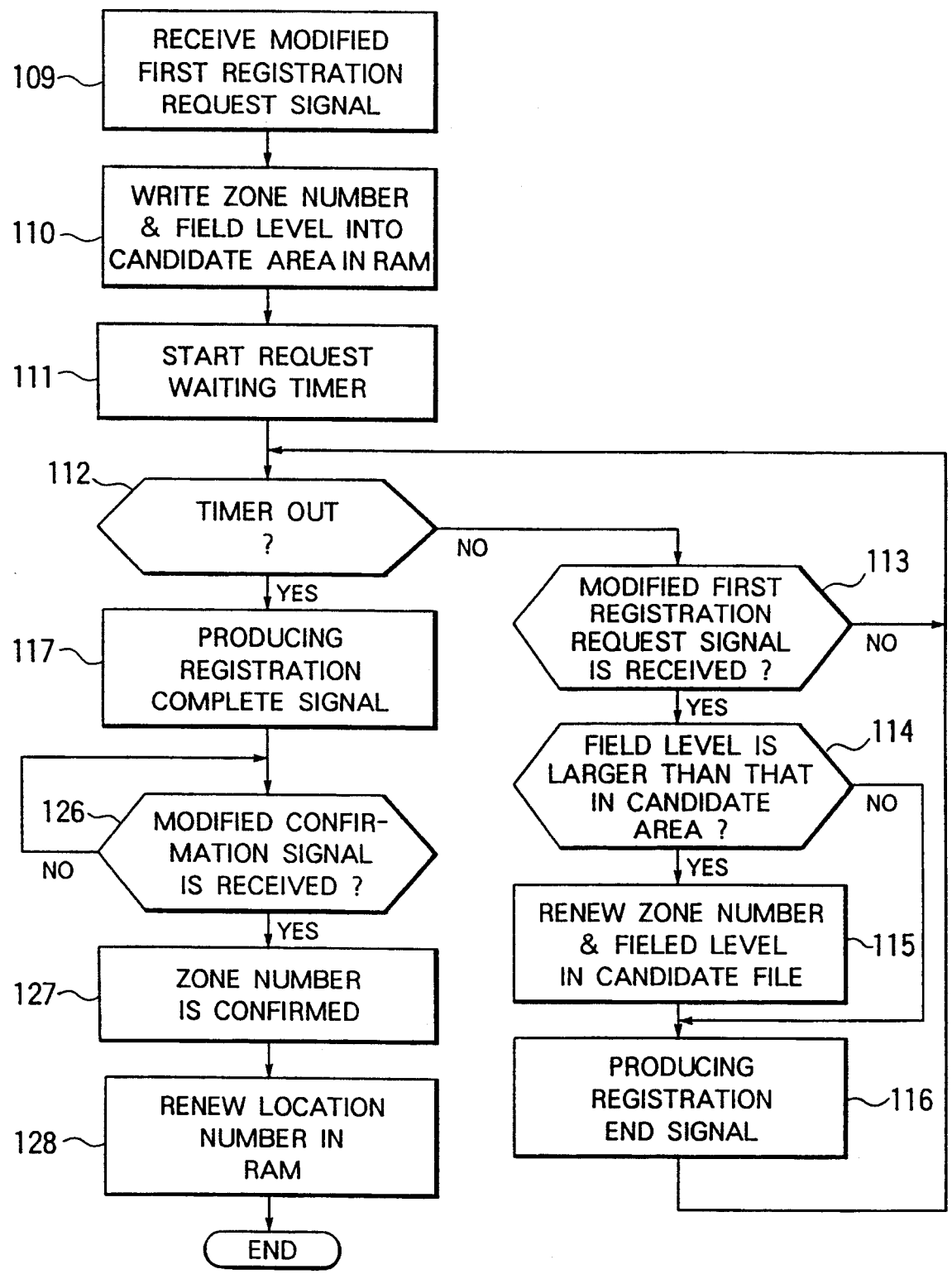
FIG. 10 is a flow chart illustrating operation of a unit controller in FIG. 2 for the first location registration according to the first embodiment.

Referring to FIG. 10, when the unit controller 44 receives the modified registration request signal at step 109 as an earlier modified first registration request signal, it starts an operation according to the first location registration program in the ROM 45. Then, the unit controller 44 writes the zone number and the reception field level signal in the earlier modified first registration request signal into the candidate area (46 in FIG. 3) corresponding to the telephone number in the earlier modified first registration request signal at step 110. Then, the unit controller 44 starts a request waiting timer at step 111 as shown at $SQ_3$ in FIG. 7.

The ROM 45 has a request waiting time value as one of the control data. The request waiting time value is set to a timer as shown at 47 in FIG. 2. Alternatively, the request waiting time value is written into an area in the RAM 46.

The unit controller 44 waits another reception of the modified registration request signal until lapse of the request waiting time is decided as shown at step 112. On the other reception of the modified first registration request signal at step 113 as a later modified first registration request signal, the field level signal in the later modified first registration request signal is compared with the field level signal in the candidate area 51 at step 114. When the former is larger than the latter, the unit controller 44 renews the candidate area 51 by the zone number and the field level signal in the later modified first registration request signal on the other reception, at step 115. Then, the unit controller 44 produces a registration end signal at step 116. The registration end signal is transmitted to one of the radio connection devices 33 which transmitted the earlier modified first registration request signal. In the example shown in FIG. 7, the registration end signal is transmitted to the radio connection device 33 in the zone $Z_1$ as shown at SQ.

If the field level signal in the later modified first registration request signal is equal to or smaller than that in the candidate area 51 at step 114, the registration end signal is also produced at step 116 and is transmitted to the radio connection device 33 which transmitted the later modified first registration request signal.

When lapse of the request waiting time is decided at step 112, the unit controller 44 produces a registration complete signal at step 117. The registration complete signal is transmitted through the secondary interface 42 to the radio connection device which has the zone number written in the candidate area 51.

In the example shown in FIG. 7, the registration complete signal is transmitted to the radio connection device 33 of the zone $Z_2$ as shown at $SQ_5$.

Returning to FIG. 9, the device controller 65 waits reception of the registration end signal and the registration complete signal at steps 118 and 119 after producing the modified first registration request signal at step 108. When the device controller 65 receives the registration end signal through the line interface 60 and the control signal transceiver 62 (FIG. 2), the device controller 65 stops the operation for the first location registration. In the example shown in FIG. 7, the device controller 65 of the radio connection device 33 in the zone $Z_1$ stops the operation.

When the device controller 65 receives the registration complete signal, it produces a modified registration complete signal at step 120 which is transmitted through the control signal transceiver 62, the radio transceiver 63 and the device antenna 64 to radio telephone sets 32, as shown at $SQ_6$ in FIG. 7. The modified registration complete signal has the own zone number of the radio connection device which transmits the modified registration complete signal, and the telephone number of the radio telephone set 32 which transmitted the first registration request signal.

Returning to FIG. 8, the set controller 75 waits reception of the modified registration complete signal at step 121 after producing the first registration request signal. When the set controller 75 receives the modified registration complete signal having the own telephone number, it writes the zone number in the modified registration complete signal into the RAM 79 as the registered zone number at step 122. Then, the set controller produces a confirmation signal having the registered zone number and the own telephone number at step 123. The confirmation signal is transmitted to radio connection devices 33 through the control signal transceiver 74, the radio transceiver 70 and the antenna 71 as shown at $SQ_7$ in FIG. 7.

Returning to FIG. 9, the device controller 65 waits the confirmation signal at step 124 after producing the modified registration complete signal at step 120. When the device controller 65 receives the confirmation signal having the own zone number through the device antenna 64, the radio transceiver 63 and the control signal transceiver 62, it repeats the signal as the modified confirmation signal at step 125. The modified confirmation signal is transmitted to the line connection unit 34 as shown at $SQ_8$ in FIG. 7.

Returning to FIG. 10, the unit controller 44 waits reception of the modified confirmation signal at step 126 after producing the registration complete signal at step 117. On reception of the modified confirmation signal, the unit controller 44 compares the zone number in the modified confirmation signal with the zone number in the candidate area 51 (FIG. 3). After the unit controller 44 confirms that the both of them are consistent with each other at step 127, it renews the location number in the registration area 50 by the zone number in the candidate area 51 at step 128. Thus, the first location registration is completely finished.

Figure 8:
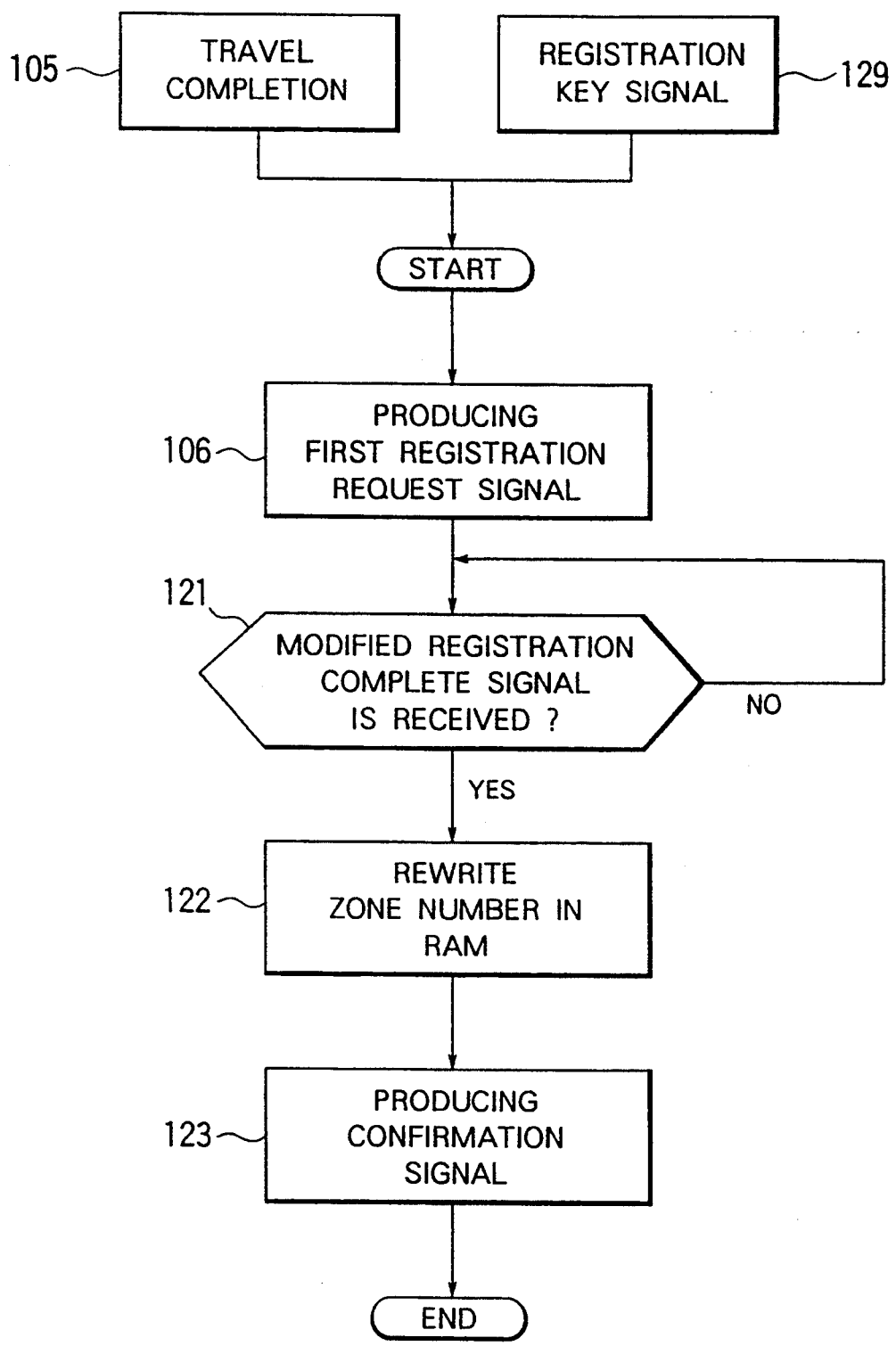
FIG. 8 is a flow chart illustrating operation of the set controller for the first location registration according to the first embodiment.

The first location registration is also started by manual operation of key 77 (FIG. 2) as shown at step 129 in FIG. 8.

Now, description will be made to the location registration system according to the second embodiment. The second embodiment is also applicable in the similar mobile radio telephone network system as shown in FIG. 2. Accordingly, the second embodiment is also described in connection with FIG. 2 for the purpose of simplification. However, it should be noted that control operation of the unit controller 44, the device controller 65 and the set controller 75 is different from the first embodiment, as will be understood with the description proceeding. Further, the RAM 79 in the radio telephone set 32 is also different from that in the first embodiment.

Figures 11, 12:
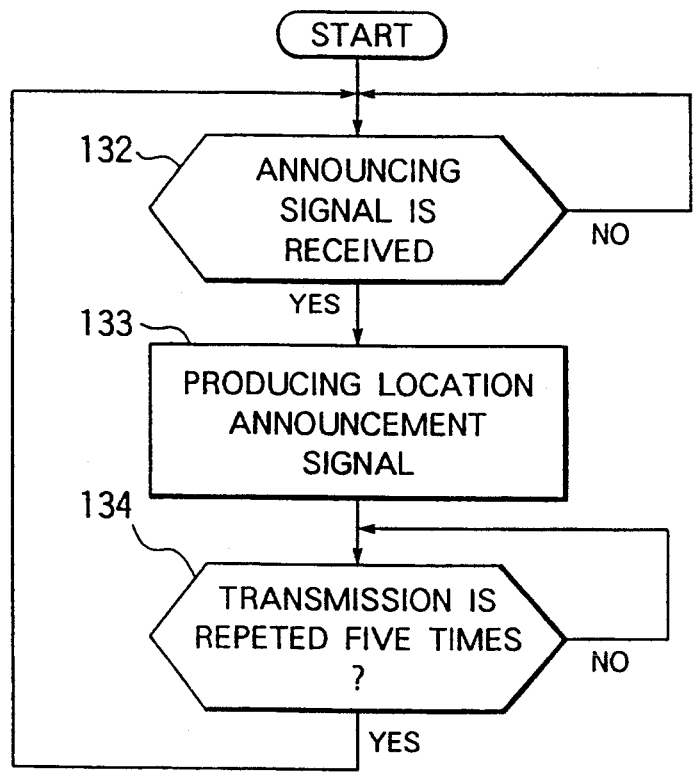
FIG. 11 is a diagram illustrating operation of an RAM in the radio telephone set in FIG. 2 according to a second embodiment.
FIG. 12 is a flow chart illustrating operation of the device controller for transmission of a location announcement signal according to the second embodiment.

Referring to FIG. 11, the RAM 79 comprises a registration file 130 and a candidate file 131. The registration file 130 is for memorizing a zone number as the registered zone number, a field level indicative of an electrical field strength of a signal received at the radio telephone set 32, and "Present" or "Wait" indicative of a reception status of the radio telephone set 32.

The candidate file 131 is also for memorizing a zone number, a field level and a reception status which are similar to those in the registration file 130 but is yet candidate as registered ones.

The unit controller 44 produces an announcing signal at time intervals. The time interval is predetermined and is memorized in the ROM 45 as one of the control data. The time interval is, for example, five (5) minutes. The announcing signal is supplied to all of the radio connection devices 33.

Referring to FIG. 12, when the device controller 65 in the radio connection device 33 receives the announcing signal at step 132, it produces a location announcement signal at step 133. The location announcement signal has the zone number which is assigned to the own radio connection device 33. The location announcement signal is repeatedly transmitted from the device antenna 64 in the zone, for example, five (5) times as shown at step 134.

Figure 13:
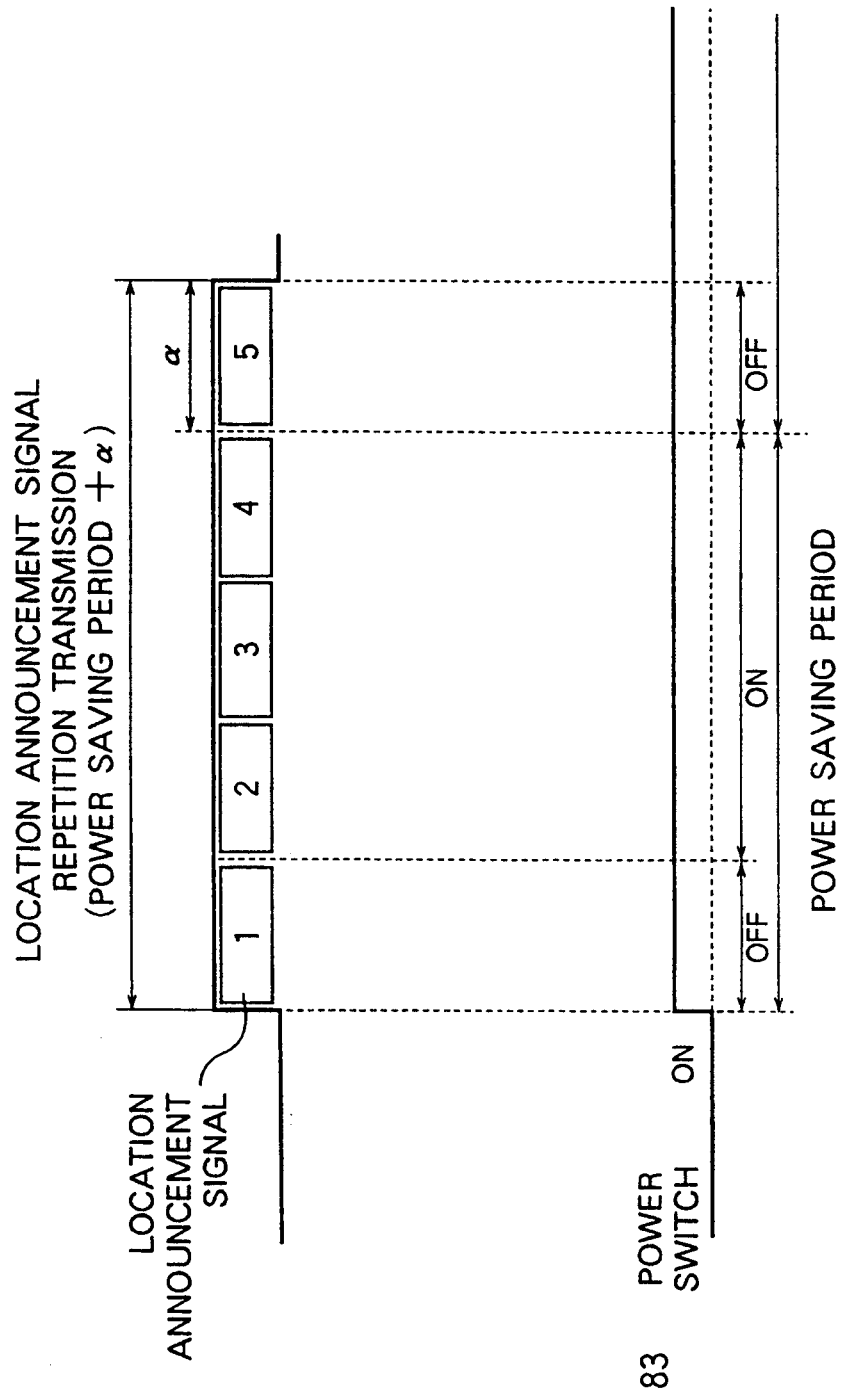
FIG. 13 is a diagram view illustrating relation between reception of the location announcement signal and a power saving in the radio telephone set.

Referring to FIG. 13, the power saving circuit 85 (FIG. 2) controls the power level supplied from the battery 82 to the various portions in the radio telephone set 32 during an ON time period of the power switch 83. In detail, the power saving circuit 85 is active for a predetermined time duration and is inactive for another predetermined time duration. The total time duration of the active and the inactive time durations is called a power saving period which is usually selected to be 0.3 to 2 seconds. A rate of the inactive or OFF duration to the active or ON duration is selected for example 1:3. During the inactive duration, the power level supplied from the battery 82 to the various portions of the radio telephone set 32 is the maximum. That is, the various portions are supplied with the power at a sufficient level and is active.

On the other hand, during the active duration of the power saving circuit 85, the minimum power is only supplied to the various portions. Therefore, various portions are almost inactive. Thus, the power consumption of the battery 82 can be maintained low.

The power saving circuit 85 is stopped or made inactive under control of the set controller 75 when the maximum power is desired for carrying out the telephone communication and other control operation.

In order to make the radio telephone set 32 reliably receive the location announcement signal during the power saving period, the radio connection device 33 transmits the location announcement signal repeatedly for a time period which is larger than the power saving period by a predetermined short time $a$. Accordingly, at least one of the repeated location announcement signals is received at the radio telephone set 32 during the inactive or OFF duration of the power saving circuit 85.

Figure 14:
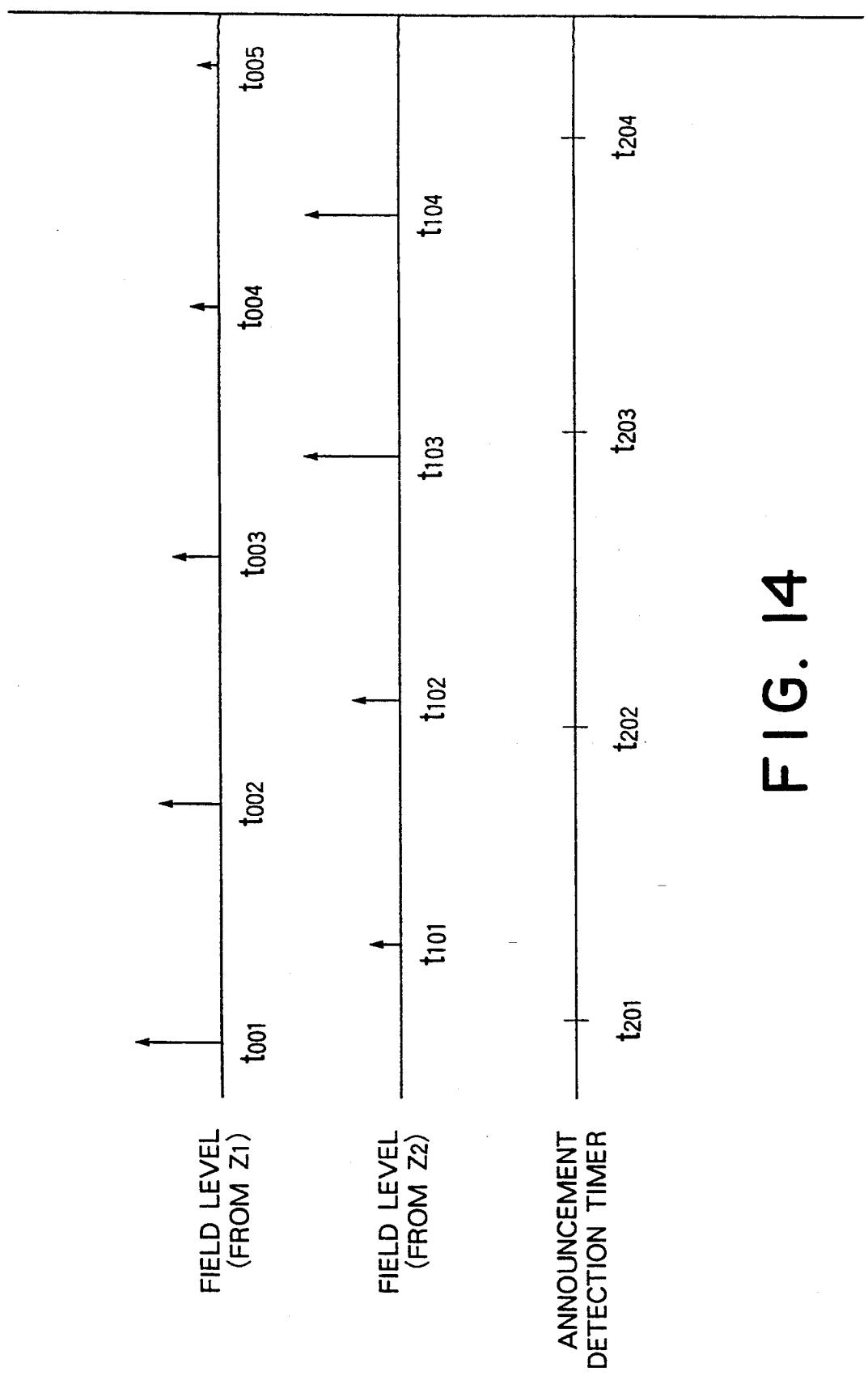
FIG. 14 is a diagram illustrating a relation between reception field levels from each radio connection device and operation of an announcement detection timer in the radio telephone set.
Figure 15:
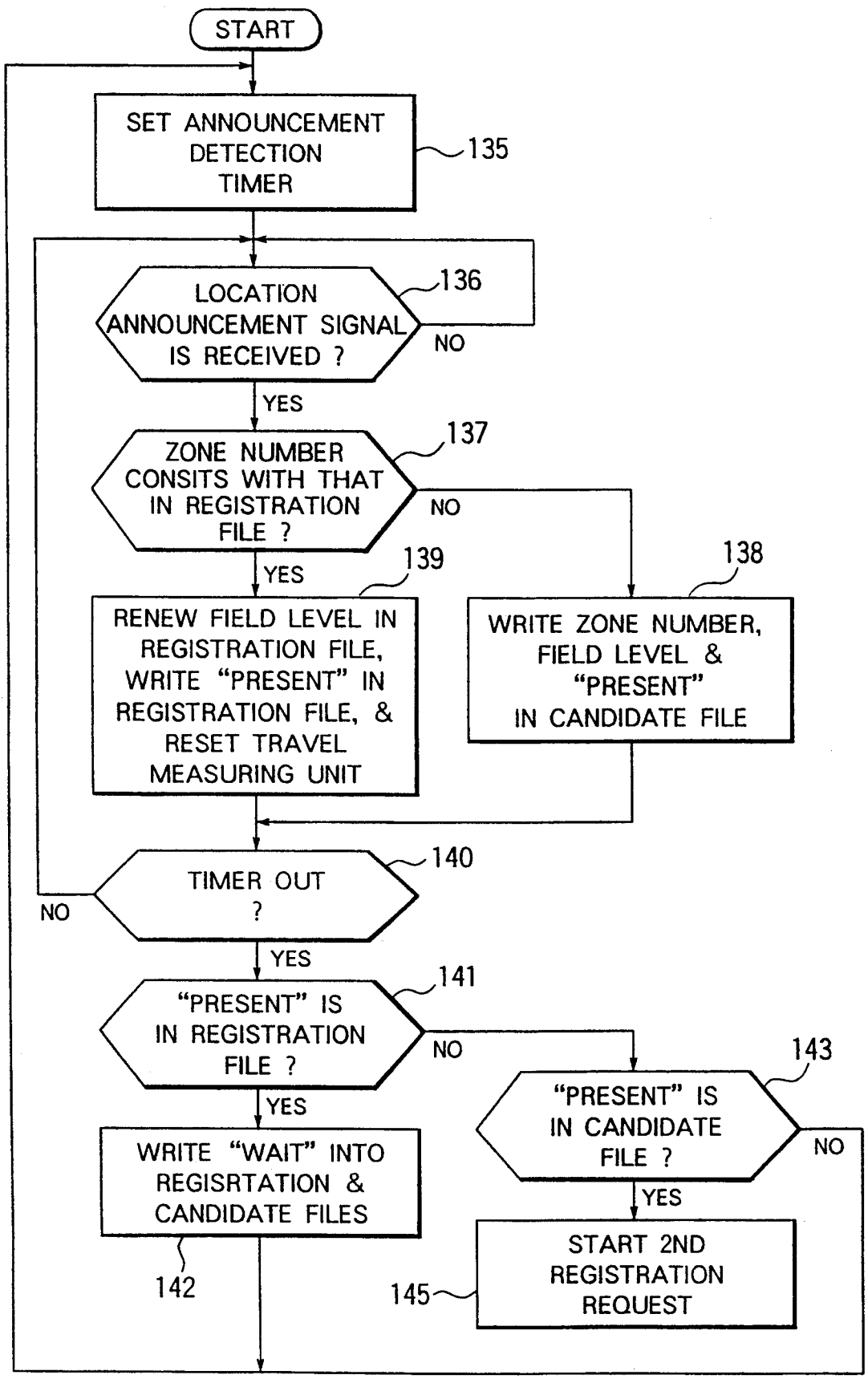
FIG. 15 is a flow chart illustrating a location announcement signal deciding operation by the radio telephone set according to the second embodiment.

Referring to FIGS. 14 and 15, description will be made as to processing the location announcement signal by the set controller 75.

It is assumed in FIG. 14 that the radio telephone set 32 receives the location announcement signal from the radio connection device 33 in the zone $Z_1$, repeatedly as shown at t001-t005 and also receives the location announcement signal from the radio connection device 33 in the zone $Z_2$ repeatedly as shown at t101-t104. The electric field level of the received signal is illustrated by the length of each arrow.

Referring to FIG. 15, the set controller 75 sets an announcement detection timer at step 135 when the power switch 83 (FIG. 2) is turned on. In detail, the ROM 78 (FIG. 2) has an announcement detection time value. The set controller 75 sets the announcement detection time value in the timer 86 (FIG. 2). The timer 86 operates even during the active duration of the power saving circuit 85. When the announcement detection timer counts up the announcement detection time value, the announcement detection timer is again set. Thus, the announcement detection timer is repeatedly set as shown at t201 to t204 in FIG. 14.

The announcement detection time value should be selected to be longer than the repeating period of the location on announcement signal, for example, six minutes.

After step 135, the set controller 75 waits reception of the location announcement signal at step 136. When the set controller 75 detects the reception of the location announcement signal, for example, from the radio connection device 33 in the zone $Z_1$, at t001 as shown in FIG. 14, the set controller 75 compares the zone number in the location announcement signal with the zone number in the registration file 130 (FIG. 11) at step 137. When the both of them are not consistent with each other, the set controller 75 writes the zone number in the location announcement signal as the candidate zone number, the field level signal of the location announcement signal as the candidate field level, and "Present" as the reception status, respectively, into the candidate file 131 (FIG. 11) at step 138. The field level signal is detected at the radio transcriber 70 (FIG. 2) and is supplied to the set controller 75.

On the other hand, the zone number of the location announcement signal is coincident with the zone number in the registration file 130, the set controller 75 rewrites the field level in the registration file 130 by the field level of the location announcement signal and writes "Present" as the reception status in the registration file 130 at step 139. The set controller 75 further resets the travel measuring unit 80 at step 139.

Thereafter, when the announcement detection timer is still in operation at step 140, the set controller 75 again executes the operation of steps 136–140. During the operation, the set controller 75 receives the location announcement signal from the zone $Z_2$ at the time t101 shown in FIG. 14.

When the announcement detection timer counts up the announcement detection time value at step 140, the set controller 75 accesses the registration file 130 (FIG. 11) at step 141. When "Present" is held as the reception status in the registration file 130, the set controller 75 writes "Wait" as the reception status into both of the registration and the candidate files 130 and 131 at step 142. Thereafter, the set controller 75 returns to the step 135.

When the "Present" is not held as the reception status in the registration file 130, the set controller 75 accesses the candidate file 131 at step 143. When the "Present" is not held as the reception status in the candidate file 131, the set controller 75 returns to step 135.

When the "Present" is held as the reception status in the candidate file 131, the set controller 75 starts an operation for a second location registration at step 145.

Now, description will be made as regards the second location registration referring to FIGS. 16–19.

The set controller 75 reads out the second location registration program from the ROM 78 and executes the program after step 145 in FIG. 15.

Figure 16:
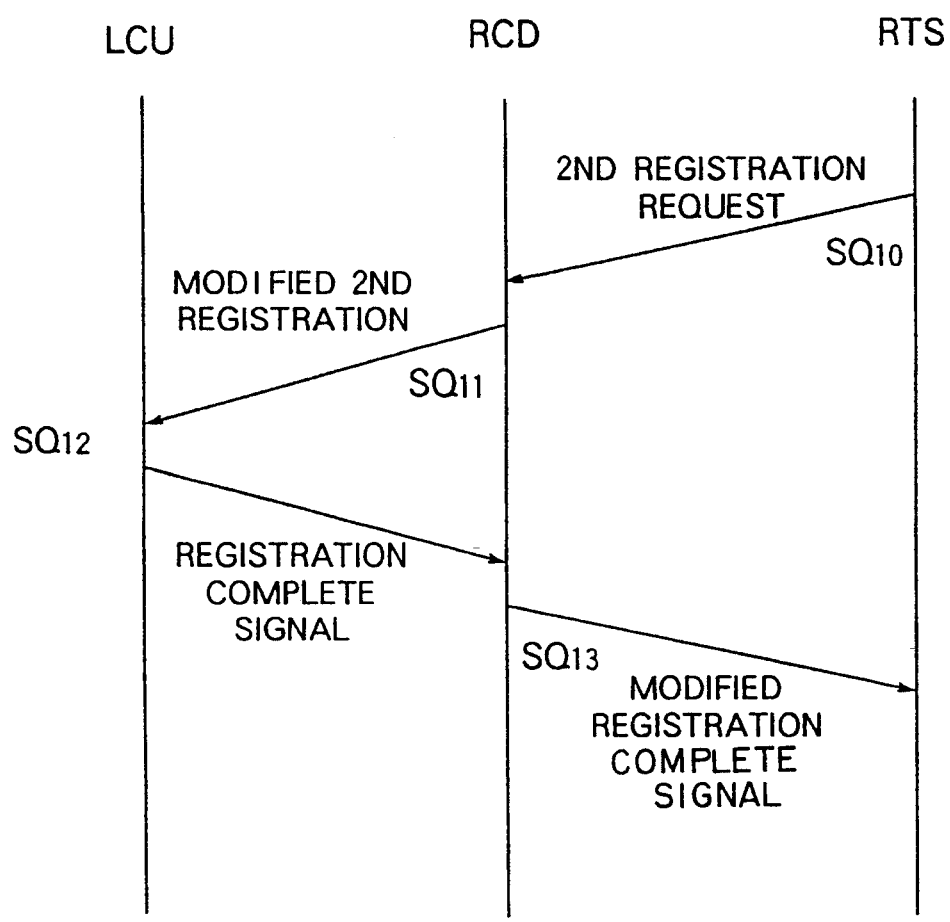
FIG. 16 is a diagram illustrating operation of a second location registration in the second embodiment.
Figure 17:
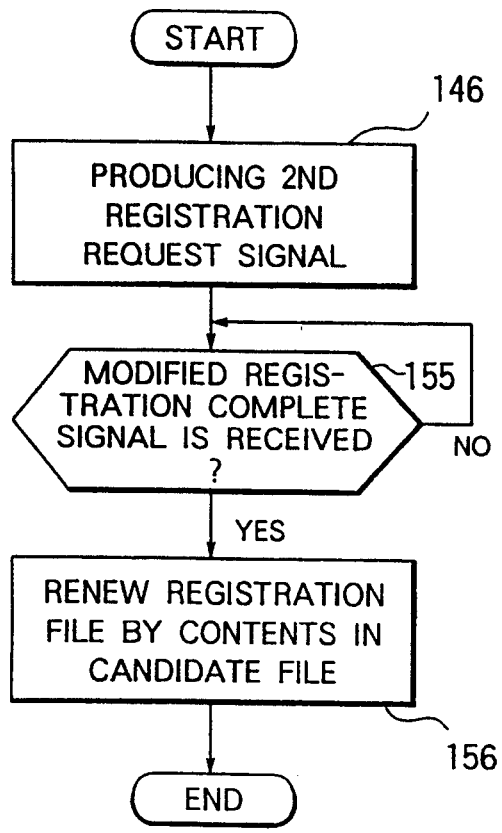
FIG. 17 is a flow chart illustrating operation of the set controller for the second location registration.

Referring to FIG. 17, the set controller 75 produces a second registration request signal which has the telephone number assigned to the own radio telephone set and the candidate zone number in the candidate file 131, at step 146. The second registration request signal is radiated from the antenna 71 through the control signal transceiver 74 and the radio transceiver 70, as shown at $SQ_{10}$ in FIG. 16.

Figure 18:
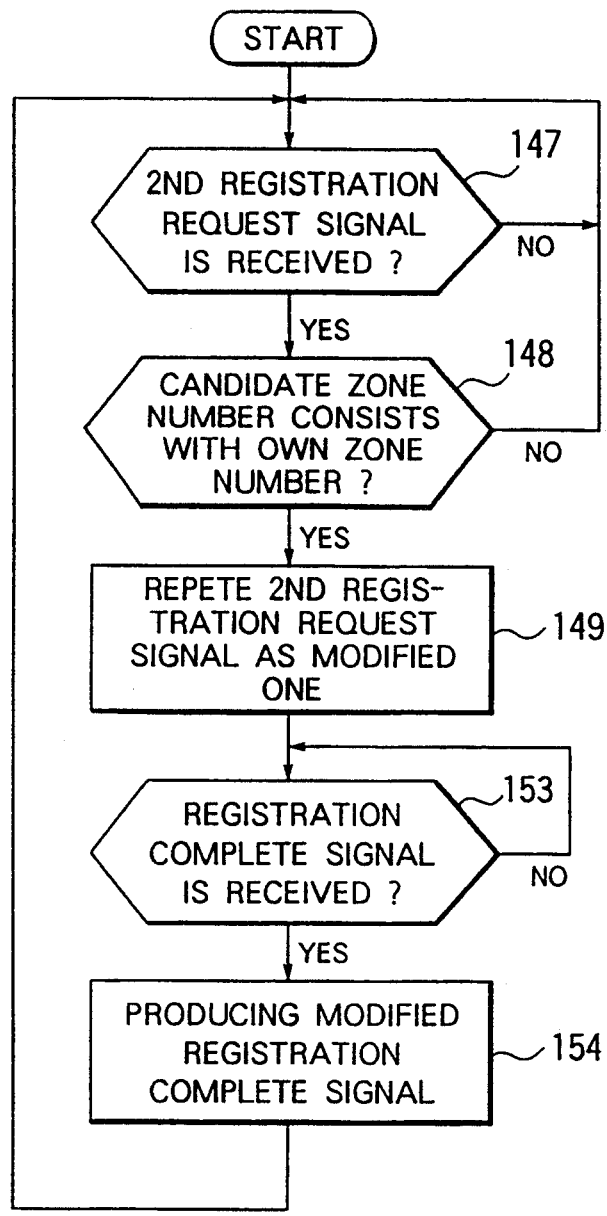
FIG. 18 is a flow chart illustrating operation of the device controller for the second location registration.

Referring to FIG. 18, when the radio connection device 33 receives the second registration request signal at step 147 and when the device controller 65 decides that the candidate zone number in the second registration request signal is equal to the zone number assigned to the own radio connection device at step 148, the device controller 65 repeats the second registration request signal and transmits it to the line connection unit 34 as a modified second registration request signal at step 149 and as shown at $SQ_{11}$ in FIG. 16.

Referring to FIG. 19, when the unit controller 44 receives the modified second registration request signal at step 150, the unit controller 44 renews the location number in the registration area 53 (FIG. 3) by the candidate zone number in the modified second registration request signal at step 151. Thus, the second location registration for the line connection unit 34 is completed. Then, the unit controller 44 produces a registration complete signal at step 152. The registration complete signal has the telephone number and the zone number equal to those in the modified second registration request signal, and is sent back to the radio connection device 33 as shown at $SQ_{12}$ in FIG. 16.

Referring to FIG. 18, when the device controller 65 detects the registration complete signal which has the own zone number at step 153, it repeats the registration complete signal as a modified registration complete signal at step 154. The modified registration complete signal is radiated from the device antenna 64 through the control signal transceiver 62 and the radio transceiver 63 as shown at $SQ_{13}$ in FIG. 16.

Returning to FIG. 17, the set controller 75 receives the modified registration complete signal which has the own telephone number at step 155, it renews the contents in the registration file 130 (FIG. 11) by the content in the candidate file 131 (FIG. 11) at step 156.

The set controller 75 carries out the travel decision in FIG. 6 in addition to the location announcement signal processing in FIG. 15. When the travel is decided complete at step 105 in FIG. 6, the set controller 75 starts an operation for selecting one of the first and the second location registration programs.

Referring to FIG. 20, the set controller 75 accesses the registration file 130 (FIG. 11) in the RAM 79 after the step 105 in FIG. 6. When the "Present" is held as the reception status in the registration file 130 at step 157, the set controller 75 ends the selecting operation. On the other hand, when the "Present" is not held in the registration file 130, the set controller accesses the candidate file 131 (FIG. 11). When the "Present" is held as the reception status in the candidate file 131 at step 158, the set controller 75 starts the second location registration at step 159. Then, the second location registration is carried out as described above in connection with FIGS. 16–19.

On the other hand, when the "Present" is not held in the candidate file 131 at step 158, the set controller 75 starts the first location registration at step 160. Then, the first location registration is carried out as described above in connection with FIGS. 7-10.

What is claimed is:

1. A location registration system for carrying out a registration of location information of movable radio telephone sets into a subscriber's file of a line connection unit through radio connection device connected to the line connection unit in a mobile telephone network system, wherein each of said radio connection devices comprises means for transmitting an individual location announcement signal having an individual zone number, and each of said radio telephone sets comprises:

a first memory file for memorizing a first status signal and first location information having a first zone number;

a second memory file for memorizing a second status signal and second location information having a second zone number;

receiving means for receiving said individual location announcement signal as a particular location announcement signal having said individual zone number as a particular zone number;

receiving means coupled with said first memory file and said receiving means for comparing said first zone number with said particular zone number, said comparing means producing a coincident signal when said first zone number is coincident with said particular zone number, said comparing means producing an error signal when said first zone number is different from said particular zone number;

first writing means coupled with said comparing means and said first memory file responsive to said coincident signal for writing particular status information in said first memory file as said first status signal;

second writing means coupled with said comparing means and said second memory file responsive to said error signal for writing said particular zone number and said particular status information in said second memory file as said second zone number and said second status information, respectively;

first reading means coupled with said first memory file for reading said first status signal to produce an access signal when said first status signal is not indicative of said particular status information;

second reading means coupled with said first reading means and said second memory file responsive to said access signal for reading said second status signal to produce a first start signal when said second status signal is indicative of said particular status information; and means coupled with said second reading means responsive to said first start signal for starting a first operation for said registration of location information.

2. A location registration system as claimed in claim 1, which further comprises:

travel amount measuring means associated with each of said radio telephone sets for measuring a travel amount of each radio telephone set;

each of said radio telephone sets comprising:

monitoring means coupled with said travel amount measuring means for monitoring the travel amount in said travel amount measuring means as a monitored travel amount;

travel completion deciding means coupled with said monitoring means for deciding completion of the travel of each radio telephone set to produce a reading signal;

said first reading means further coupled with said deciding means and reading said first status signal responsive to said reading means;

said second reading means producing a second start signal when said second status signal is not indicative of said particular status information; and means coupled with said second reading means responsive to said second start signal for starting a second operation for said registration of location information.

3. A location registration system for carrying out registration of information representing the location of movable radio telephone sets into a subscriber's file of a line connection unit through a radio connection device connected to the line connection unit in a mobile telephone network system which comprises:

travel amount measuring means associated with each of said radio telephone sets for measuring a travel amount of each radio telephone set;

each of said radio telephone sets comprising:

monitoring means coupled with said travel amount measuring means for monitoring the travel amount in said travel amount measuring means as a monitored travel amount;

travel completion deciding means coupled with said monitoring means for deciding completion of the travel of each radio telephone set;

registration starting means coupled with said travel completion deciding means for starting said registration of location information;

first holding means for holding a first threshold value;

second holding means for holding a second threshold value smaller than said first threshold value;

timer means having a predetermined operable time period after start;

resetting and starting means coupled with said monitoring means, said travel amount measuring means and said timer means for resetting said travel amount measuring means and starting said timer means when said monitored travel amount exceeds said first threshold value;

said monitoring means monitoring said travel amount measuring means to produce a monitored value as said monitored travel amount when said timer means stops its operation; and said deciding means further coupled with said second holding means and deciding said completion of the travel when said monitored value is smaller than said second threshold value.

4. A location registration system as claimed in claim 3, wherein said resetting and starting means further resets said travel amount measuring means and starts said timer means when said monitored value exceeds said second threshold value.

* * * * *